United States Patent [19]

Szymczak

[11] Patent Number: 5,261,495
[45] Date of Patent: Nov. 16, 1993

[54] IMPLEMENT CONTROL

[75] Inventor: Dominique Szymczak, Beauvais, France

[73] Assignee: Massey-Ferguson Services N.V., Netherlands Antilles

[21] Appl. No.: 770,107

[22] Filed: Oct. 2, 1991

[30] Foreign Application Priority Data

Jan. 11, 1991 [GB] United Kingdom ............... 9100665

[51] Int. Cl.$^5$ .......................................... A01B 41/06
[52] U.S. Cl. .......................................... 172/2; 172/4; 280/414.5; 280/43.24
[58] Field of Search ............ 56/121.46, 10.2, DIG. 15; 172/2, 4, 239, 315, 316; 280/414.5, 43.24

[56] References Cited

U.S. PATENT DOCUMENTS

| 3,233,682 | 2/1966 | Thompson | 172/316 |
| 3,517,747 | 6/1970 | Fischer . | |
| 3,762,480 | 10/1973 | Hofer | 172/4 |
| 3,918,529 | 11/1975 | Frager et al. | 280/414.5 |
| 4,093,248 | 6/1978 | Gassner et al. | 172/2 |
| 4,231,432 | 11/1980 | Jennings . | |
| 4,518,044 | 5/1985 | Wiegardt et al. | 172/3 |
| 4,878,543 | 11/1989 | Kauss | 172/4 |
| 5,025,866 | 6/1991 | Schmidt et al. | 172/6 |
| 5,031,704 | 7/1991 | Fleischer et al. | 172/6 |

FOREIGN PATENT DOCUMENTS

| 0078697 | 5/1983 | European Pat. Off. . | |
| 3235818 | 3/1984 | Fed. Rep. of Germany . | |
| 3522430 | 10/1986 | Fed. Rep. of Germany . | |
| 2533409 | 3/1984 | France . | |
| 2655810 | 6/1991 | France . | |
| 190955 | 12/1963 | Sweden | 280/414.5 |
| 8604770 | 8/1986 | World Int. Prop. O. | 172/2 |

OTHER PUBLICATIONS

Rademaker, "Een Elektronisch Gestuurde Hefinrichting", vol. 38, No. 9 Sep. 1987 pp. 942-943 (Netherlands)—no translation.

Primary Examiner—Randolph A. Reese
Assistant Examiner—Spencer Warnick
Attorney, Agent, or Firm—MacMillan, Sobanski & Todd

[57] ABSTRACT

A control system for the co-ordination of the operation of first and second implements mounted at spaced locations relative to the intended direction of travel of a tractor vehicle. The system can be used to co-ordinate the operation of spaced parts of a larger common implement (e.g. spaced shares on a long plough) or completely separate implements (e.g. ploughs mounted one on the front and the other on the rear of the tractor vehicle). The control system includes actuators for controlling the operation of the first and second implements, a speed sensor for sensing the forward speed of the tractor/implement combination, sensors to indicate the operating condition of the implements and an implement spacing compensation means which allows adjustment of the co-ordination of the operation of the implements dependent on the spacing between the implements. An electronic control circuit is also provided which is capable of storing one or more implement operating routines and automatically controls the implement actuators so that the implements follow a predetermined operating routine relative to each other. The system is particularly concerned with co-ordination of the start and finish of the operation of the implements.

17 Claims, 6 Drawing Sheets

IMPLEMENT CONTROL

BACKGROUND OF THE INVENTION

This invention relates to the control of agricultural implements and in particular to implement arrangements which due to their size or complexity are difficult to control manually. As used herein, the term "implement" refers to an overall earth working mechanism, such as a plough, while the term "tool" refers to an individual earth working device, such as a plough share, mounted on an implement. For example, larger implements (such as long ploughs) are often mounted at one position (typically the front end of the implement) on a tractor vehicle via a movable implement support linkage and are supported at another position (typically the rear or center region of the implement) on a wheel or other ground engaging means.

Conventionally, such implements are controlled manually by the tractor operator who adjusts the position of the support linkage and wheel by visual inspection in order to maintain the implement at the required height and attitude. Each adjustment of depth made on the support linkage must be followed very quickly by an adjustment of the depth of the support wheel. Operation of such implements thus requires considerable skill and high levels of concentration make their use tiring, particularly bearing in mind the relatively complex maneuvering required each time the implement (for example, a plough) is lowered or raised at the beginning and end of each pass along the field in order to obtain a minimum length of headland.

SUMMARY OF THE INVENTION

It is an object of the present invention to provide a control system for the above type of implement which will remove the need, at least for the majority of the time, for the operator to control the implement by visual inspection. Thus according to the present invention there is provided a control system for the co-ordination of the operation of first and second tools mounted at spaced locations on an implement, relative to the intended direction of travel of a tractor vehicle, the system comprising:

- actuator means for controlling the operation of the implement,
- sensing means for sensing the forward speed of the tractor/implement,
- implement operating condition sensing means,
- implement length compensation means to allow adjustment of the coordination of the operation of the implement dependent on the length between the tools mounted on the implement relative to the intended direction of travel of the tractor vehicle, and
- electronic control means capable of storing one or more implement operating routines, the electronic control means receiving inputs from the forward speed sensing means, implement operating condition sensing means and implement length compensation means to automatically control the operation of the actuator means so that the first and second tools follow a predetermined operating routine relative to each other as they move along in the intended direction of travel.

In one application of the invention, the first and second tools may be spaced plough shares forming part of a common plough mounted at one end on the tractor vehicle via a movable support linkage and also supported from the ground via a wheel or other ground engaging means.

In such an application the actuator means may comprise a fluid pressure operated actuator fed via a fluid-flow control valve to control the position of the support wheel relative to the remainder of the plough, the implement operating condition sensing means comprising first and second position sensing means which feed to the electronic control means the position of the support wheel relative to the remainder of the plough and the support linkage relative to the tractor vehicle respectively, and the implement length compensation means will be adjusted to take into account the length of the plough (e.g. the spacing between the first and last plough shares) so that the electronic control means produces a control signal for the control valve to ensure that the movement of the support wheel follows the movement of the support linkage in accordance with a predetermined operating routine.

With such a system the relationship between the movement of the support wheel and linkage can be arranged, for example, to provide the required overall pattern of movement of the plough during downward movement of the plough from the transport to its required working depth; during working of the plough, and during movement of the plough from its working position to its transport position.

For example, in a typical semi-mounted plough installation the implement support linkage is controlled by a tractor mounted actuator and the ground engaging support wheel is controlled by a plough mounted actuator. Thus the system can be provided with a plough lowering routine during which the relationship between the movement of the tractor mounted and plough mounted actuators is such that the front of the plough is lowered first by the linkage and the rear of the plough is lowered progressively thereafter, by the plough mounted actuator moving the wheel relative to the plough, to provide a smooth entry into work of each plough share in a predictable and consistent manner (independently of the length between the first and last tools mounted on the implement and the tractor forward speed). Typically each plough share will be arranged to attain its desired working depth as it passes through substantially the same vertical entry plane in the field.

Similarly, the system can be provided with a raising routine during which the front of the plough is raised first by the linkage and the rear of the plough is raised progressively thereafter, by the plough mounted actuator moving the wheel relative to the plough, to provide a smooth exit from work of each plough share in a predictable and consistent manner (independently of the implement length and the tractor forward speed). Typically each plough share will be arranged to begin its exit from work as it passes through substantially the same vertical exit plane in the field.

Also a normal working routine can be provided during which movements of the linkage made by the tractor mounted actuator are replicated with a predetermined gain by the support wheel which is moved by the plough mounted actuator so that the plough as a whole remains at a generally consistent horizontal attitude as it is raised and lowered by the system.

The present invention also provides a system for the control of the working position of an implement mounted at one end on a tractor via a movable implement support linkage and supported from the ground via a wheel or other ground engaging means, the system comprising:

- a fluid pressure-operated actuator to control the position of the support wheel or other ground engaging means relative to the implement,
- a fluid flow control valve to control the supply to and venting of pressurized fluid from the actuator,
- first position sensing means to sense the actual position of the implement support linkage,
- second position sensing means to sense the actual position of the support wheel relative to the implement,
- speed sensing means to sense the forward speed of the tractor/implement combination,
- desired position setting means to set a desired position of the support wheel relative to the implement,
- implement length compensation means to allow adjustment of the relative movement of the linkage and support wheel to take into account the length of the implement, and
- electronic control means capable of storing one or more operating routines, the electronic control means receiving the actual position, desired position, forward speed and length of compensation signals and generating a control signal for the control valve to try to maintain the desired support wheel position while ensuring that movements of the linkage are followed by movements of the support wheel in accordance with a predetermined operating routine.

In such a system the position of the linkage is regulated (for example by a control system already provided on the tractor) to try to maintain at least one implement or tractor performance parameter (e.g. draft force, hitch position or wheel slippage rate) at a value set by the tractor operator.

There is also provided a system for the control of the working position of an implement mounted at one end of a tractor via a movable implement support linkage and supported from the ground via a wheel or other ground engaging means, the system comprising:

- a first fluid pressure-operated actuator to control the position of the implement support linkage relative to the tractor,
- a second fluid pressure-operated actuator to control the position of the support wheel or other ground engaging means relative to the implement,
- a source of pressured fluid,
- first and second fluid flow control valves to control the supply to and venting of pressurized fluid from the first and second actuators respectively,
- first position sensing means to sense the actual position of the implement support linkage,
- second position sensing means to sense the actual position of the support wheel relative to the implement,
- speed sensing means to sense the forward speed of the tractor/implement combination,
- desired position setting means to set a desired position of the support wheel relative to the implement,
- performance parameter setting means to set a desired value of one or more performance parameters in response to which the position of the linkage is to be controlled,
- implement length compensation means to allow adjustment of the relative movement of the linkage and support wheel to take into account the length of the implement, and
- electronic control means capable of storing one or more operating routines and which receives the actual position, desired position, forward speed, desired performance parameter value(s) and length compensation signals, the electronic control means generating a first control signal for control of the first control valve to operate the first actuator to change the position of the linkage in order to try to maintain the linkage performance parameter(s) at the set desired value and also generating a second control signal for control of the second control valve so that movement of the second actuator and support wheel tries to maintain the desired support wheel position while ensuring that movements of the linkage are followed by movements of the support wheel in accordance with a predetermined operating routine.

Another application of the present invention is the control of multiple implement combination in which, for example, the first implement is a plough mounted on the front of the tractor vehicle and the second implement is a second plough mounted on the rear of the tractor vehicle.

In such applications the system may be arranged, for example, on receipt of a signal from an initiating means, to lower the first implement into work and then, after an appropriate delay, automatically initiate lowering of the second implement into work so that all the plough shares on each of the first and second ploughs attain their desired working depth as they pass through substantially the same vertical entry plane.

Similarly, such a system could also be arranged to co-ordinate the raising of the first and second ploughs so that on receipt of an initiating signal to raise the first plough out of work, the system automatically, after an appropriate delay, initiates raising of the second plough so that all the plough shares on each of the first and second ploughs begin their exit from work as they pass through substantially the same vertical exit plane.

It will be appreciated that the present invention is also applicable to a wide range of implement combinations in addition to ploughs. For example, a fertilizer spreader may be mounted on the front of the tractor vehicle and a power harrow and seed drill may be mounted on the rear of the tractor vehicle. If the present invention were to be applied to such a combination, the system would co-ordinate the commencement and finish of the operation of each of the three implements so that all three implements commence operation as they pass through substantially the same vertical entry plane and finish operation as they pass through substantially the same exit plane.

BRIEF DESCRIPTION OF THE DRAWINGS

The present invention will now be described by way of example only, with reference to the accompanying drawings in which.

DESCRIPTION OF THE PREFERRED EMBODIMENT

Figure 1:
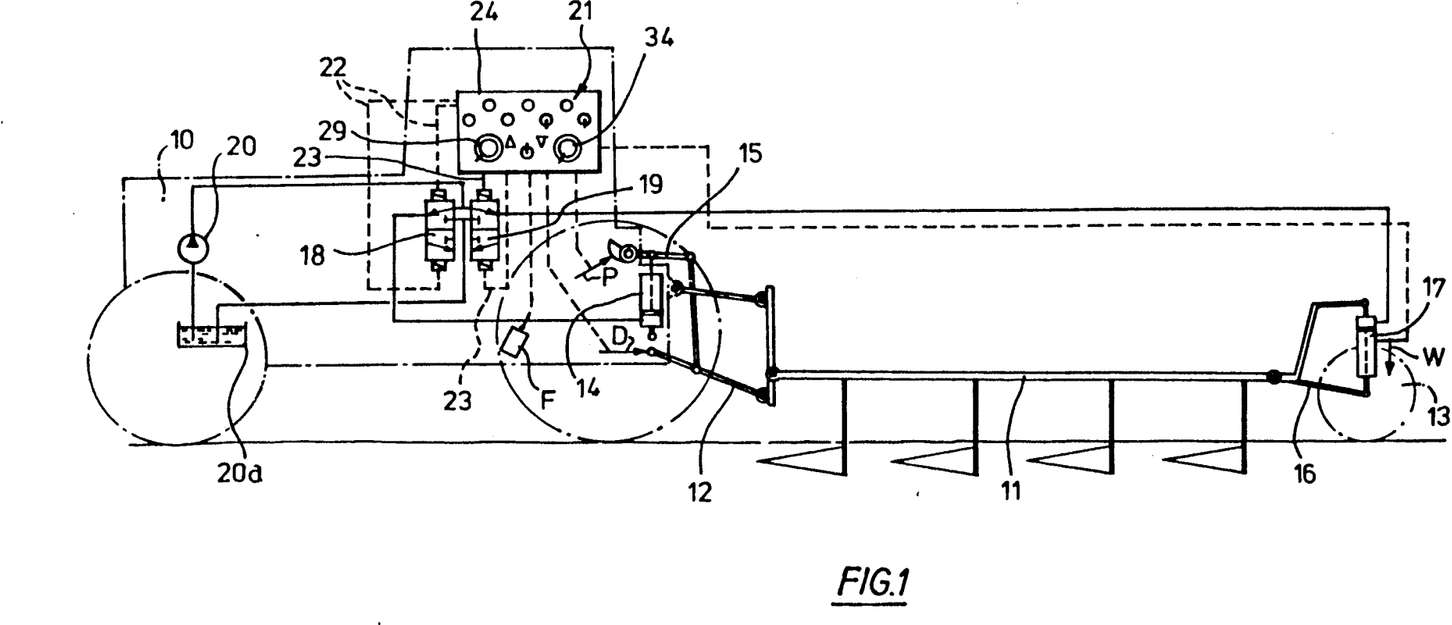
FIG. 1 is a diagrammatic view of a tractor and semi-mounted plough combination fitted with a control system embodying the present invention.

Referring to FIG. 1, this shows diagrammatically tractor 10 and a semi-mounted plough 11. The front end of the plough 11 is mounted on the tractor using a conventional 3-point linkage 12 and the rear of the plough is supported from the ground by a wheel 13. The 3-point linkage is raised and lowered relative to the tractor by a pair of lift cylinders 14 which act between lift arms 15 of the linkage and the rear of the tractor chassis. The wheel 13 is mounted on the main frame of plough 11 by a pivoting link 16 whose angular position relative to the plough is controlled by a wheel cylinder 17, which acts between the link 16 and the plough frame.

As will be appreciated, the height of the front end of the plough relative to the ground is controlled by lift cylinders 14 of the 3-point linkage 12 while the height of the rear end of the plough is controlled by cylinder 17.

First and second solenoid operated control valves 18 and 19 are mounted on the tractor and control the supply of pressurized fluid to and the exhaust of fluid from the cylinders 14 and 17 respectively. Pressurized fluid is supplied to the valves 18 and 19 by pump 20 from a reservoir 20a to which fluid is returned on exhausting from valves 18 and 19. Valves 18 and 19 may be completely separate from each other or may be individual parts of a common valve housing. If desired, valve 19 could be located on the plough 11.

The operation of control valves 18 and 19 is controlled by an electronic control means as indicated diagrammatically in FIG. 1 at 21 which is mounted on the tractor. This electronic control means is connected to valves 18 and 19 via lines 22 and 23 respectively and issues control signals to the valves to control the relative movement of cylinders 14 and 17 in order to achieve the desired overall movement of the plough. The electronic control means 21 receives inputs from lower link draft force sensors indicated at D in FIG. 1, a linkage position sensor indicated at P, a wheel position sensor indicated at W and a forward tractor speed sensor indicated at F which may be of any suitable form, for example, of the radar or toothed disc type. The control panel 24 of the electronic control means 21 is shown in greater detail in FIG. 2 and the various features of the control system will be described in greater detail with reference to this control panel and the schematic diagram of FIG. 3.

Figure 2:
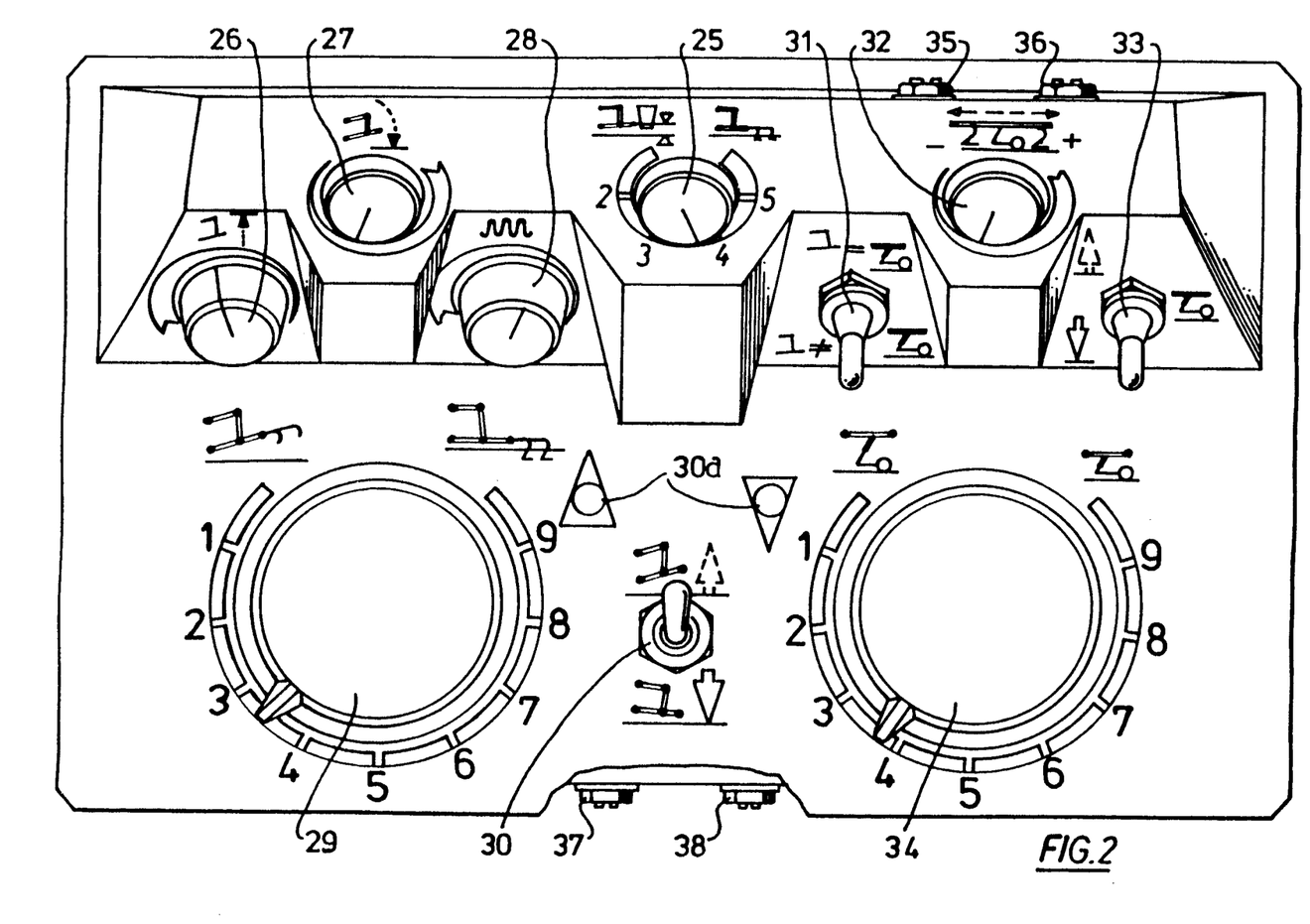
FIG. 2 shows the control panel of the system of FIG. 1 in more detail.

Referring to FIG. 2, the left hand half of the control panel essentially controls the operation of the 3-point linkage 12 while the right hand half of the control panel is directed to the control and setting up of the implement. Although the system described is provided with a combined control panel it will be appreciated, from a consideration of FIGS. 3A and 3B described later below, that the existing control panel provided for the 3-point linkage 12 may be utilized and a separate control panel provided for the implement.

Rotary knob 25 selects whether the control system is to operate in pure position control at unmarked knob position 1, or in pure draft control at unmarked knob position 6 at the other end of the range of rotation of the knob. The intermediate marked knob positions 2, 3, 4 and 5 are indicative of different proportions of intermix when the system operates under the control of a mixture of the position and draft signals in a known manner.

Rotary knob 26 controls the maximum position to which the 3-point linkage can be raised. It is necessary to be able to vary this height since on certain implements projecting parts might otherwise come through the rear window of the tractor.

Rotating knob 27 controls the rate at which the 3-point linkage falls when the system is commanded to lower the implements.

Rotary knob 28 controls the sensitivity of the system from a lower sensitivity position gradually to a higher sensitivity position.

Dial 29 is used, dependent on the mode of operation of the system, to set either the desired value of the position of the 3-point linkage or the draft force to be experienced by the 3-point linkage which the control system will try to maintain.

Main switch 30 is used, as indicated by the legend 30a, to command raising of the implement when in its upper position and lowering of the implement when in its lower position. Mode control switch 31 when moved to its upper position places the control system in its automatic mode in which the system provides control signals for the control of both valves 18 and 19 in a predetermined relationship to each other so a desired overall control of the tractor and implement combination is achieved. With switch 31 in its lower position, the control of the 3-point linkage 12 and the rear wheel 13 is independent with the operator providing the feed back control loop for the rear wheel.

Rotary knob 32 is used to adjust the time phasing between the movement of the 3-point linkage and the wheel 13 to take account of the overall length of the implement as will be described below. Implement control switch 33 is provided with 2 positions, a 'raise' position in which the operator can override the system to raise the rear of the implement and a 'lower' position in which the movement of the rear wheel cylinder is under the control of the system.

Dial 34 is used by the operator to set the position of the wheel 13. This setting has 2 different effects on the position of the wheel, depending on the position of the switch 31. When the switch 31 is in the lower position (independent control mode), dial 34 controls the movement of the wheel 13 on all the displacement strokes of cylinder 17. When the switch 31 is in the upper position (automatic control mode), dial 34 allows a correction of the pre-adjusted working depth of the wheel. This correction cannot be more than 25% of the initial setting.

Two further controls are provided for the system which must be adjusted during the initial setting up a tractor/implement combination. The first is a rotary potentiometer 35 which is used to ensure that, when the 3-point linkage is raised to its maximum height position, wheel 13 is also moved to its maximum height position. A second rotary potentiometer 36 is also provided to adjust the percentage copy (or gain) of the movement of the 3-point linkage by the movement of the rear wheel. At one end of the scale of potentiometer 36 the rear wheel makes no movement in response to the movement of the 3-point linkage, whereas at the other end of its scale rear wheel 13 may move vertically 300% of the vertical movement of the 3-point linkage.

The setting up procedure for a new tractor/implement combination is as follows:

With the tractor stationary, the 3-point linkage is raised to its highest possible position without relief of a pressure relief valve (not shown) in the pump circuit. The first rotary potentiometer 35 is then adjusted to ensure that cylinder 17 is also fully extended so that the rear of the implement is also at its maximum height.

Again with the tractor stationary the second stationary rotary potentiometer 36 is adjusted to set the copy or gain relationship between the movement of 3-point linkage 12 and wheel support link 16 such that when the 3-point linkage is moved through its full vertical travel, the rear of the implement also moves through its full range of travel so that the desired full range of movement of the implement can be obtained.

In addition to the above static adjustments, the operator must also adjust rotary knob 32 during initial use of the implement in the field to take into account the effective length of the implement to ensure that during the lowering and raising routines of the system, the time phasing between the operation of lift cylinder 14 and wheel cylinder 17 is such as to give the desired overall movement of the implement.

Figure 4A:
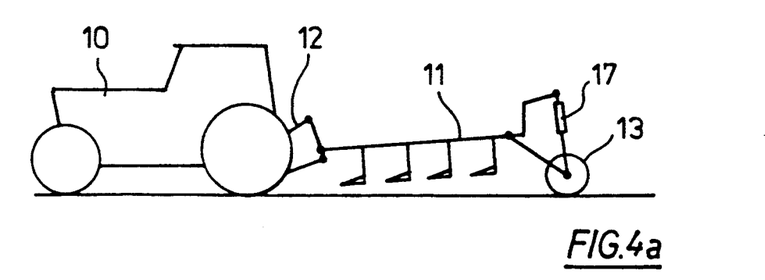
FIGS. 4a–c show various stages in the lowering routine of the plough of FIG. 1.
Figure 4B:
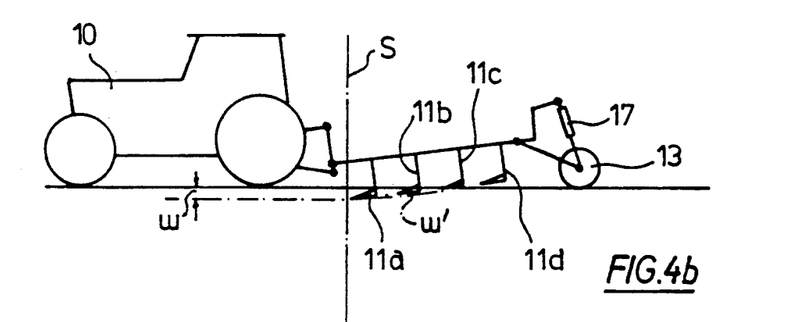
Figure 4C:
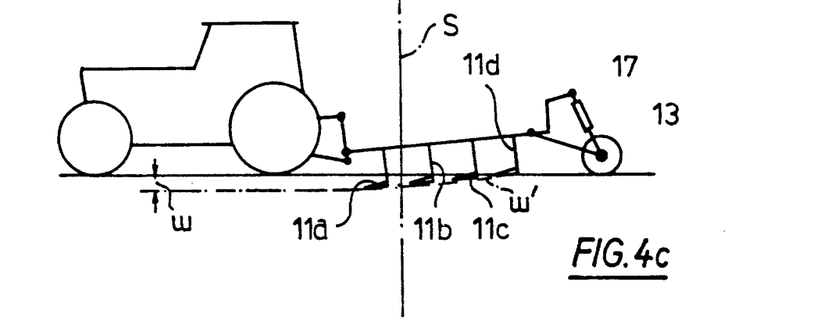

For example, FIGS. 4a to 4c show diagrammatically several stages in the operation of a semi-mounted plough with an end support wheel 13. In FIG. 4a the tractor/plough combination is in its transport position with both the 3-point linkage and rear wheel in their highest positions ready to start the lowering routine to lower the plough to its working position. In FIG. 4b, the leading plough share 11a has moved to its working depth w along a path w', the second plough share 11b is just below the surface and beginning its movement to the working depth w along a similar path w' and the third plough share 11c is about to contact the ground. In position 4c, the first and second plough shares 11a and 11b have both reached the working depth w and the third plough share 11c is beginning to move to its working depth w along a similar path w'.

Thus by suitable adjustment of rotary length compensation knob 32, all of the plough shares 11a–11d can be arranged to attain their correct working depth as they pass through substantially the same vertical plane S in the field so that the start of each pass down the field has a uniform appearance and consequent uniform cultivation which is extremely difficult to obtain when the lowering operation is manually controlled.

In a similar manner in the raising routine of the system, the phase relationship between the raising of the 3-point linkage 12 and the wheel 13 is such that the plough shares 11a–11d begin to leave their working position as they pass through substantially the same vertical exit plane again improving field appearance and cultivation uniformity.

The forward speed sensor F permits the electronic control means 21 to control the simultaneous movement of the tractor support linkage and the support wheel independently of the time the implement needs to run over the path w' in order to have always the same path w' for all forward speeds of the tractor.

Two further controls in the form of potentiometers 37 and 38 are provided to take into account the rotation of the plough about the axis of rotation of its support wheel 13 which occurs when the linkage 12 is raised and lowered. The plough rotation is more pronounced when using a plough with a center-mounted support wheel (as shown in FIGS. 5a, b and c).

Figure 5A:
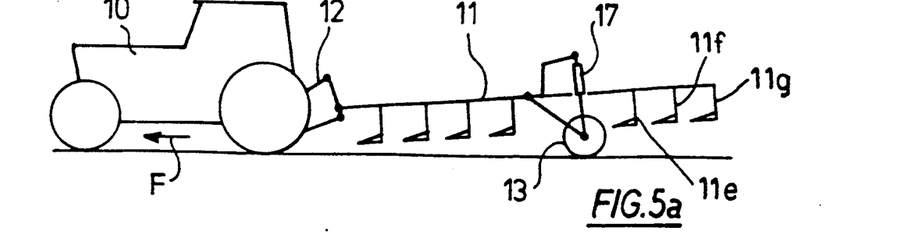
FIGS. 5a–5c show similar stages in the lowering routine of a plough fitted with a center-mounted support wheel, and FIG. 6 diagrammatically shows the invention applied to the co-ordination of the operation of front and rear mounted implements.
Figure 5B:
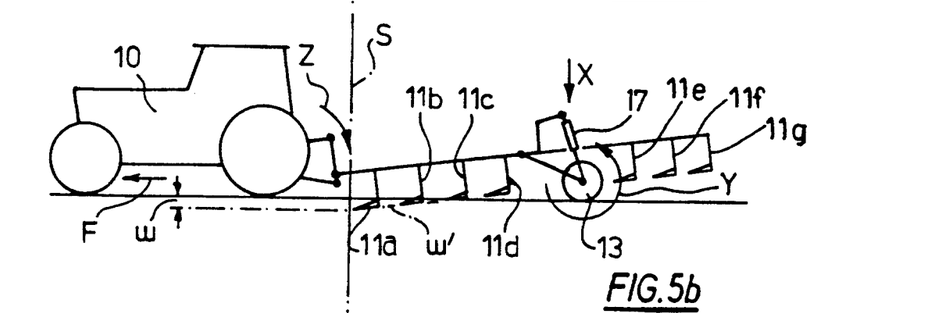
Figure 5C:
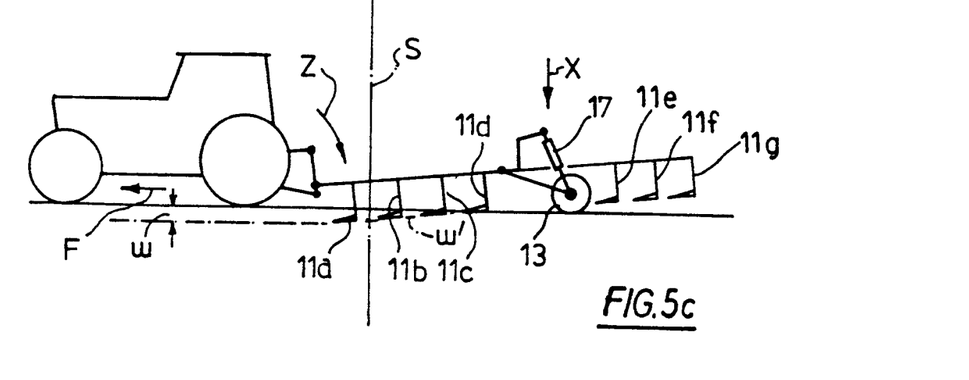

Referring to FIGS. 5a, b and c at the beginning of the lowering routine, the support linkage 12 of the tractor moves first (see arrow Z) to engage correctly the plough share 11a, this induces a rotation (see arrow Y) of the implement around the axis of the wheel 13 and so the plough shares 11e, 11f, and 11g tend to move to a higher position (FIG. 5b). This difference of position, if it is not corrected immediately, will increase considerably the length of path w'.

The setting of potentiometer 37, determines the amount of lowering of the implement (see arrow X) using wheel cylinder 17 which takes place during the first phase of lowering routine in order to correct the rotation effect. The amount of lowering of the implement which is necessary depends on the particular length of the implement behind the wheel rotation axis.

The potentiometer 38 is used to correct the same problem of implement rotation during the beginning of the raising routine. The setting of potentiometer 38 avoids an increase of the working depth of plough shares 11e, 11f, 11g when the tractor support linkage goes into its raising routine by raising the implement using wheel cylinder 17.

The setting of potentiometers 37 and 38 is also needed on an implement with a rear wheel though the effect of rotation is smaller than a center wheel implement but these potentiometers again enable the entry and exit furrows length to be optimized.

Returning now to the actual operation of the system, to lower the implement the operator moves switch 31 to the upper position which gives automatic control by the system of both the 3-point linkage and the rear wheel, and the implement control switch 33 is moved to its 'lower' position to unlock the wheel cylinder 17. The operator then moves main switch 30 to the lower position to commence the lowering routine as outlined above.

Once the lowering routine is completed, the control of the implement in response to variations in the position signal or draft signal or the combination of position/draft signals, is such that the implement maintains a generally constant attitude as it is raised or lowered by the lift cylinders 14 and wheel cylinder 17. The position of the hitch 12 is controlled to try to maintain the value of position/draft set on dial 29 (as in a normal tractor hitch control system) and the control system automatically adjusts the position of support wheel 13 in response to the changes in the position of hitch 12 while trying to maintain the support wheel position at the value set on dial 34.

Occasionally, the operator may wish to raise the rear of the implement, for example, to clear an obstruction such as tree roots, this is achieved by moving implement switch 33 to its 'raise' position.

Also, the operator may wish to deviate from the standard lowering and raising routines in certain conditions This he can do by a combination of the operation of switches 30 and 33.

At the end of a pass down the field, the operator raises the implement by moving switch 30 to the raise position which initiates the raising routine described above to raise the implement in a controlled manner to the transport position.

Figure 3A:
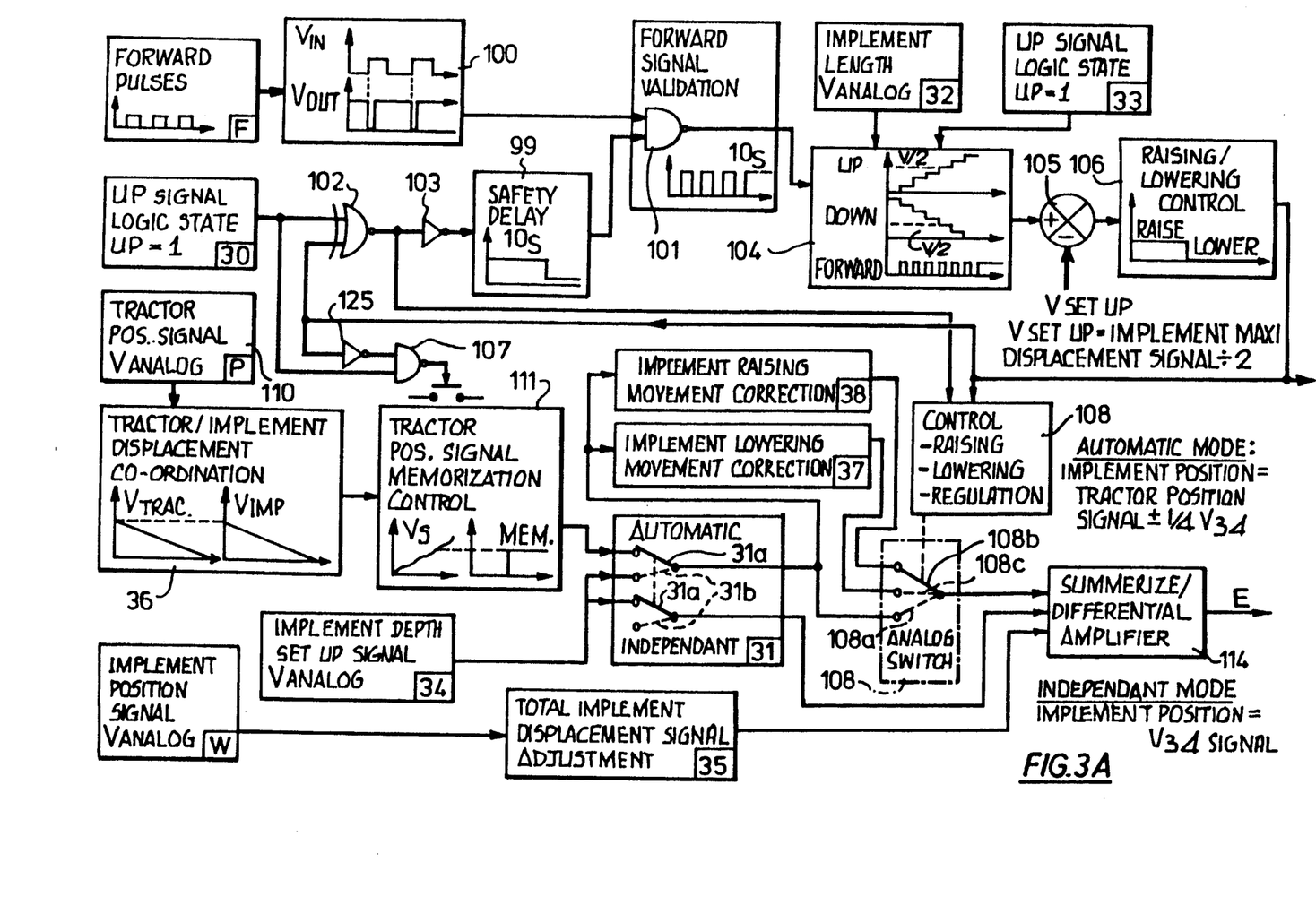
FIGS. 3A and 3B show a diagrammatic representation of a control system in accordance with the present invention.
Figure 3B:
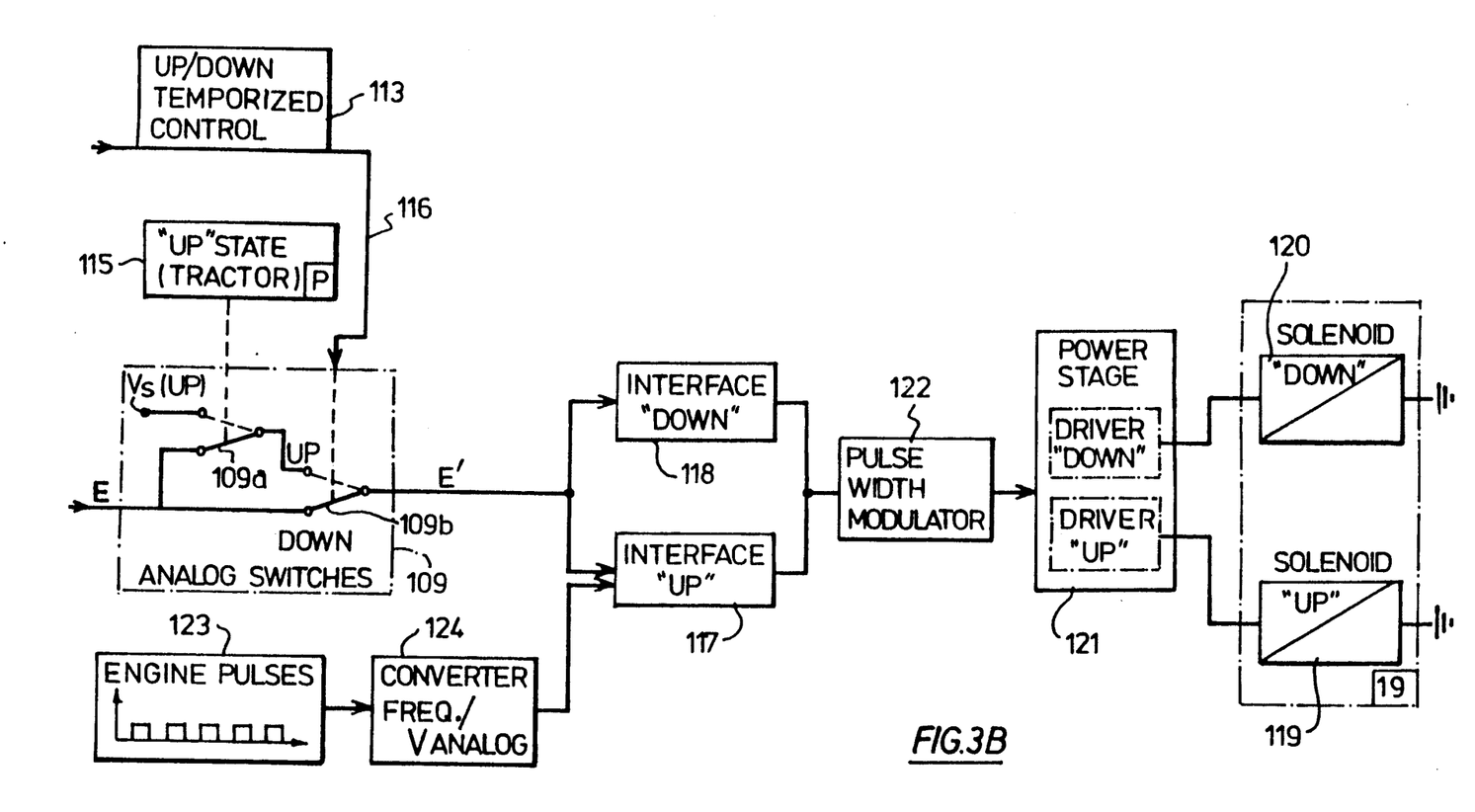

FIGS. 3A and 3B show a schematic diagram of the control system in which the reference numerals and letters previously used in relation to FIGS. 1 and 2 have been used to label corresponding boxes in the diagram.

As can be seen from the left-hand side of FIGS. 3A the system which controls the movement of support wheel 13 requires no real connection with the normal control system for the hitch 12 already provided on the tractor. Thus it is clear that the control panel for the implement support wheel could be separated from the normal tractor-mounted control panel for hitch 12 as mentioned above. As is evident the required hitch position signal P and forward speed signal F could be obtained from the existing tractor-mounted hitch control system sensors from separate sensors.

As indicated by Box 100 of FIG. 3A, the forward speed signal from sensor F is processed from a square wave form to an inverse spike form whose frequency is proportional to tractor forward speed. This signal is then fed to a NAND gate 101 together with the output from switch 30 which passes via EXNOR gate 102 inverter 103 and safety delay 99. Safety delay 99, in conjunction with NAND gate 101, limits to a maximum predetermined value (typically 10 seconds) the maximum delay between the beginning of the raising or lowering of the tractor linkage 12 and the beginning of the raising or lowering of the implement by cylinder 17.

Box 104 represents the time phasing between the movement of linkage 12 and the wheel 13 which is achieved on rotation of knob 32. Basically, each time a forward speed spike is received a timing capacitor is either charged up (if a "raise" command has been issued by switch 30 or 33) or discharged (if a "lower" command has been issued by switch 30 or 33) by a predetermined amount. The current level of charge on the timing capacitor is compared in summing junction 105 with a set-up valve, which experience has shown should be approximately equal to half of the maximum implement displacement, and when the charge on the timing capacitor has risen to (or fallen to) this set-up value then a "raise" (or "lower") signal is issued to the remainder of the system as indicated by box 106. This raise "1" or lower "0" signal is fed to EXNOR gate 102, NAND gate 107 and analog switches 108 and 109.

As indicated by box 110, the analog tractor position signal from sensor P is fed via adjustable gain control 36 and a tractor "position signal" memorization control 111 to two-gang mode switch 31 which also receives the analog implement depth signal from dial 34. The tractor position signal memorization control 111 memorizes the last tractor hitch position just before the beginning of the raising routine in order to continue regulation of the position of the wheel 13 during the raising routine. NAND gate 107 and inverter 125 validate the memorization control 111 when switch 30 sends an "up" signal and control 106 sends a "lower" signal. In all other cases the tractor position signal 110 from sensor P is fed directly to switch 31.

One output of mode switch 31 is connected via raising routine potentiometer 38 or lowering routine correction potentiometer 37 with analog switch 108 and hence with a differential amplifier 114. Differential amplifier 114 also receives the actual implement depth signal from position sensor W via adjustable gain control potentiometer 35.

With mode switch 31 in the automatic mode position 31a and analog switch 108 in its "regulation" position 108a, when the system is actually regulating the depth of the implement as opposed to responding to a raise or lower command from switch 30 or 31, the differential amplifier 114 receives the tractor position signal from control 111, the implement depth set signal from dial 34 and the actual implement depth from sensor W. The set and actual implement depths are compared in differential amplifier 114 to produce an error signal E which is limited to ensure that actual implement depth remains within 25% of the current tractor position signal from sensor P.

With switch 31 in the independent position 31b and analog switch 108 in the regulation position 108a, the differential amplifier receives only the actual and set implement depth signals which again produce an error signal E which is not limited relative to the tractor position signal.

As can be seen from box 108, when the system is actually raising or lowering the switch occupies the appropriate "raising" or "lowering" 108b or 108c position and the tractor position signal is fed via the appropriate potentiometer 37 or 38 to receive the appropriate adjustment to take account of plough rotation as the linkage is raised or lowered (see FIGS. 4 and 5).

Analog switch 109 is also of a two-gang construction. When the implement is down in work the two contacts 109a and 109b are in their solid line down positions so that the error signal E is fed through the switch and emerges as error signal E'.

When the tractor operator commands raising of the implement to its fully raised or transport position and the position sensor P indicates that movement of the linkage 12 has commenced, a signal is relayed to move contact 109a to the dotted line position shown in FIG. 3B in which passage of the error signal E through contact 109a is interrupted and a signal Vs is passed through contact 109a which commands continued movement of the linkage to the set transport position. This transport signal is not able to exit analog switch 109 via contact 109b until this contact has also been moved to its dotted line position by the receipt of a signal via line 116. This signal in line 116 (indicated by explanatory box 113) is generated after a detection of a raising or lowering command on switches 30 or 33. The delay in generation of the signal in line 116 depends on implement length (adjusted with 32), and is proportionate to tractor forward speed. As discussed above, this delay is limited to 10 seconds, to ensure the correct phasing of the movement of the implement support wheel relative to the tractor linkage.

The signal exiting from switch 109 may be either a raise or lower signal depending on the operational state of the system. Raise signals are arranged to be at a higher voltage level than lower signals so that the signals are automatically recognized by an appropriate "up" or "down" valve solenoid interface shown diagrammatically at 117 and 118 respectively. Each respective interface drives the appropriate "up" or "down" valve solenoid 119 and 120 via a power stage 121 and a pulse width modulation function 122.

To take account of the variation of hydraulic flow rate with engine speed, in order to ensure a substantially constant speed of raising of the hitch and implement at all engine speeds, a sensor 123 is provided which produces a signal representative of engine speed. This engine speed signal which is of a pulse form, is converted into an analog voltage in converter 124 which is used to weight any "up" signal to increase the starting intensity in the "raise" solenoid in order to get a higher hydraulic flow at the beginning of raising movements at lower engine speeds.

As will be appreciated, the position of the linkage 12 may be controlled in accordance with a wide range of known algorithms, for example, the system may operate under PID control. Also, the linkage may respond to a wide range of set parameter values in addition to or in place of the position/draft force parameters described above. For example, the system may respond to a set level of tractor driving wheel slippage so that a set plough working depth is maintained unless the driving wheel slippage exceeds a preset limit (e.g. 15%) whereupon the working depth is reduced until the slippage is less than the preset value whereupon the working depth is again progressively increased back to the preset depth subject to the slippage again not rising above the preset limit.

Figure 6:
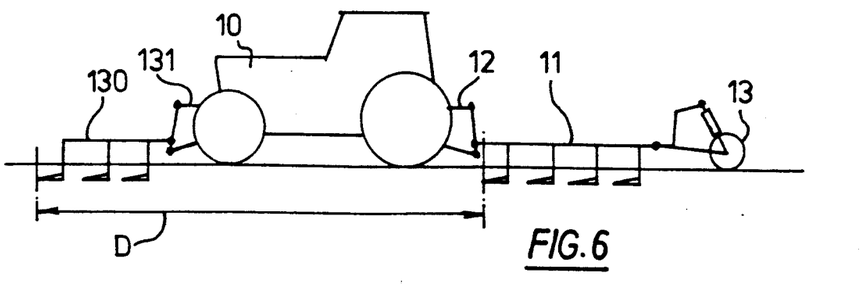

In addition to controlling the engagement of the individual plough shares of a single plough, as described in detail above, the basic principles of the present invention can also be applied to the co-ordination of multiple implement combinations such as, for example, a front fully-mounted plough 130 and a rear semi-mounted plough 11 as shown diagrammatically in FIG. 6.

If the invention were used to control such a combination the control system could be arranged, for example, to lower the front mounted plough 130 into work on a front 3-point linkage 131 upon a command from the tractor operator and then to automatically initiate lowering of the second rear mounted plough 11 into work (using the lowering routine described above in detail) after an appropriate delay (dependent on the spacing D between the ploughs and the forward speed of the tractor/plough combination) so that all the plough shares of the front and rear mounted ploughs reach their desired working depth as they pass through the same vertical entry plane thus ensuring a neat headland in the field. Similarly, the system could be arranged to co-ordinate the exit from work of all the plough shares so that they all leave their working position as they pass through the same vertical exit plane.

The invention can also be utilized to co-ordinate the operation of a wide range of implement combinations in addition to ploughs. For example, a fertilizer spreader may be mounted on the front of the tractor and a power harrow and seed drill mounted on the rear of the tractor. With such a combination, the system could again co-ordinate the start and finish of the operation of each of the three implements so that all the implements start operation as they pass through the same vertical entry plane in the field and finish operation as they pass through the same vertical exit plane.

I claim:

1. A control system for the co-ordination of the operation of first and second tools mounted at spaced locations on an implement relative to the intended direction of travel of an implement vehicle, the implement and the tractor vehicle forming a tractor/implement combination, the system comprising:
    actuator means for controlling the operation of the implement,
    sensing means for sensing the forward speed of the tractor/implement combination,
    implement operating condition sensing means,
    implement length compensation means to allow adjustment of the co-ordination of the operation of the implement dependent on the length between the particular tools mounted on the implement relative to the intended direction of travel of the tractor vehicle; and
    electronic control means capable of storing one or more implement operating routines, the electronic control means receiving inputs from the forward speed sensing means, implement operating condition sensing means and implement length compensation means to automatically control the operation of the actuator means so that the first and second tools follow a predetermined operating routine relative to each other irrespective of the forward speed of the tractor/implement combination as they move along in the intended direction of travel.

2. A control system according to claim 1 for use with an implement mounted on the tractor vehicle via a movable support linkage and also supported from the ground via a ground engaging means relative to the remainder thereof, said implement operating condition sensing means comprising first and second position sensors which feed to said electronic control means the position of the ground engaging means relative to the remainder of the implement and the support linkage relative to the tractor vehicle respectively, and said implement length compensation means being adjusted to take account of the spacing between the first and second tools so that said electronic control means ensures that the movement of ground engaging means follows the movement of the support linkage in accordance with a predetermined operating routine.

3. A control system according to claim 2 for use with a semi-mounted plough implement which is supported by a ground engaging wheel wherein the first and second tools are spaced plough shares of the plough, the support linkage being controlled by a tractor mounted actuator, said electronic control means further comprising a plough lowering routine which controls the relationship between the movement of the tractor mounted and plough mounted actuators so that the front of the plough is lowered first by the support linkage and the rear of the plough is lowered progressively thereafter by the wheel actuator to provide a smooth entry into work of each plough share.

4. A control system according to claim 3 wherein each plough share attains its working depth as it passes through substantially the same vertical entry plane in the field.

5. A control system according to claim 3 in which said electronic control means is also provided with a raising routine during which the front of the plough is raised first by the linkage and the rear of the plough is raised progressively thereafter by the wheel actuator to provide a smooth exit from work of each plough share.

6. A control system according to claim 5 in which the raising routine ensures that each plough share begins its exit from work as it passes through substantially the same vertical exit plane in the field.

7. A control system according to claim 2 for use with a semi-mounted plough implement which is supported by a ground engaging wheel wherein the first and second tools are spaced plough shares of the plough, the support linkage being controlled by a tractor mounted actuator and the ground engaging wheel by a plough mounted actuator, said electronic control means further comprising a normal working routine during which movement of the linkage made by the tractor mounted actuator are replicated with a predetermined gain by the ground engaging wheel which is operated by the plough mounted actuator so that the plough as a whole remains at a generally consistent horizontal attitude as it is raised and lowered by the system.

8. A control system according to claim 3 wherein the tractor-mounted and plough-mounted actuators comprises fluid pressure operated cylinders controlled by respective solenoid-operated fluid flow control valves.

9. A control system according to claim 8 wherein the fluid flow control valves and associated fluid supply system are mounted on the tractor.

10. A control system according to claim 8 wherein the fluid flow control valve associated with the plough-mounted actuator is mounted on the plough.

11. A control system according to claim 2 provided with a combined control panel for the control of the tractor-mounted movable support linkage and the first and second tools.

12. A system for the control of the working position of an implement mounted at one end on a tractor via a movable implement support linkage and supported from the ground via a wheel or other ground engaging means, the implement and the tractor forming a tractor-/implement combination, the system comprising:
a fluid pressure-operated actuator to control the position of the support wheel or other ground engaging means relative to the implement,
a fluid flow control valve to control the supply to and venting of pressurized fluid from the actuator,
first position sensing means to sense the actual position of the implement support linkage,
second position sensing means to sense the actual position of the support wheel relative to the implement,
speed sensing means to sense the forward speed of the tractor/implement combination,
desired position setting means to set a desired position of the support wheel relative to the implement,
implement length compensation means to allow adjustment of the relative movement of the linkage and support wheel to take into account the length of the particular implement used, and
electronic control means capable of storing one or more operating routines, the electronic control means receiving the implement support linkage actual position, the support wheel actual position, desired position, forward speed and length compensation signals and generating a control signal for the control valve means to automatically maintain the desired support wheel position while ensuring that movements of the linkage are followed by movement of the support wheel in accordance with a predetermined operating routine irrespective of the forward speed of the tractor/implement combination.

13. A system for the control of the working position of an implement mounted at one end on a tractor via a movable implement support linkage and supported from the ground via a wheel or other ground engaging means, the implement and the tractor forming a tractor-/implement combination, the system comprising:
a first fluid pressure-operated actuator to control the position of the implement support linkage relative to the tractor,
a second fluid pressure-operated actuator to control the position of the support wheel or other ground engaging means relative to the implement,
a source of pressured fluid,
first and second fluid flow control valves to control the supply to and venting of pressurized fluid from the first and second actuators respectively,
first position sensing means to sense the actual position of the implement support linkage,
second position sensing means to sense the actual position of the support wheel relative to the implement,
speed sensing means to sense the forward speed of the tractor/implement combination,
desired position setting means to set a desired position of the support wheel relative to the implement,
performance parameter setting means to set a desired value of one or more performance parameters in response to which the position of the linkage is to be controlled,
implement length compensation means to allow adjustment of the relative movement of the linkage and support wheel to take into account the length of the particular implement used, and
electronic control means capable of storing one or more operating routines and which receives the implement support linkage actual position, the support wheel actual position, desired position, forward speed and length compensation signals, the electronic control means generating a first control signal for control of the first control valve to operate the first actuator to change the position of the linkage in order to maintain the linkage performance parameter(s) at the set desired value and also generating a second control signal for control of the second control valve so that movement of the second actuator and support wheel maintains the desired support wheel position while ensuring that movements of the linkage are followed by movements of the support wheel in accordance with a predetermined operating routine irrespective of the forward speed of the tractor/implement combination.

14. A control system for the co-ordination of the operation of first and second tools mounted at spaced locations relative to the intended direction of travel of a tractor vehicle, the implements and the tractor vehicle forming a tractor/implement combination, and the implements being completely independent, the system comprising:
actuator means for controlling the operation of the first and second implements,
sensing means for sensing the forward speed of the tractor/implement combination,
implement operating condition sensing means,
implement length compensation means to allow adjustment of the co-ordination of the operation of each of the implements dependent on the length between tools respectively mounted on each of the first and second implements used relative to the intended direction of travel of the tractor vehicle; and
electronic control means capable of storing one or more implement operating routines, the electronic control means receiving inputs from the forward speed sensing means, implement operating condition sensing means and implement length compensation means to automatically control the operation of the actuator means, the electronic control means being arranged, on receipt of an initiation signal to commence operation of the first implement, to initiate operation of the first implement and then, after an appropriate delay, to initiate automatically operation of the second implement so that both implements commence operation as they pass through substantially the same vertical entry plane in the field irrespective of the forward speed of the tractor/implement combination.

15. A control system according to claim 13 in which said electronic control means is arranged, on receipt of an initiating signal to cease operation of the first implement and then, after an appropriate delay, to initiate automatically, the cessation of the second implement so that both implements cease operation as they pass through substantially the same vertical exit plane in the field.

16. A control system according to claim 15 wherein the first implement is mounted on the front of the tractor vehicle via a first movable support linkage and the second implement is mounted on the rear of the tractor via a second movable support linkage, and said actuator means further comprising first and second tractor mounted actuators for control of the first and second support linkages respectively.

17. A control system according to claim 16 wherein the second implement is also supported from the ground via a ground engaging means, said actuator means further comprising an actuator mounted on the second implement for control of the position of the ground engaging means relative to the remainder of the second implement, said implement operating condition sensing means further comprising first and second position sensors which feed to said electronic control means the position of the ground engaging means relative to the remainder of the second implement and the second support linkage relative to the tractor vehicle respectively.

* * * * *

UNITED STATES PATENT AND TRADEMARK OFFICE
CERTIFICATE OF CORRECTION

PATENT NO. : 5,261,495

DATED : November 16, 1993

INVENTOR(S) : Dominique Szymczak

It is certified that error appears in the above-identified patent and that said Letters Patent is hereby corrected as shown below:

Column 11, line 4, after "travel of", change "an implement" to -- a tractor --.

Column 12, line 6, after "actuator", insert -- and the ground engaging wheel by a plough mounted actuator --.

Column 12, line 9, change "movement" to -- movements --.

Column 13, line 3, change "prises" to -- prise --.

Column 13, line 34, after "by", change "movement" to -- movements --.

Column 13, line 2, after "end", change "on" to -- of --.

Column 13, line 38, after "speed", insert -- , desired performance parameter value(s) --.

Column 14, line 2, after "second", change "tools" to -- implements --.

Column 14, line 4, after "and", delete "the".

Column 15, line 1, after "claim", change "13" to -- 14 --.

UNITED STATES PATENT AND TRADEMARK OFFICE
CERTIFICATE OF CORRECTION

PATENT NO. : 5,261,495
DATED : November 16, 1993
INVENTOR(S) : Dominique Szymczak It is certified that error appears in the above-indentified patent and that said Letters Patent is hereby corrected as shown below:

Column 15, line 1, after "claim", change "13" to -- 14 --.

Signed and Sealed this

Tenth Day of May, 1994

Attest:

BRUCE LEHMAN

Attesting Officer

Commissioner of Patents and Trademarks